United States Patent
Shakespeare et al.

(10) Patent No.: US 10,055,110 B2
(45) Date of Patent: Aug. 21, 2018

(54) SIMULATING A USER INTERFACE TO SUBMIT DATA RECEIVED FROM A DEVICE

(71) Applicant: Oracle International Corporation, Redwood Shores, CA (US)

(72) Inventors: Darryl Shakespeare, Denver, CO (US); Aaron Johnson, Castle Pines, CO (US); Nicole Laurent, Lakewood, CO (US)

(73) Assignee: Oracle International Corporation, Redwood Shores, CA (US)

( * ) Notice: Subject to any disclaimer, the term of this patent is extended or adjusted under 35 U.S.C. 154(b) by 349 days.

(21) Appl. No.: 14/838,909

(22) Filed: Aug. 28, 2015

(65) Prior Publication Data

US 2017/0031578 A1    Feb. 2, 2017

Related U.S. Application Data

(60) Provisional application No. 62/197,479, filed on Jul. 27, 2015.

(51) Int. Cl.
*G06F 3/0482*    (2013.01)
*G06F 3/0484*    (2013.01)

(52) U.S. Cl.
CPC ........ *G06F 3/04847* (2013.01); *G06F 3/0482* (2013.01); *G06F 3/04842* (2013.01)

(58) Field of Classification Search
CPC .................................................... G06F 3/0482
USPC ........................................................ 715/704
See application file for complete search history.

(56) References Cited

U.S. PATENT DOCUMENTS

| | | | | |
|---|---|---|---|---|
| 5,737,592 A * | 4/1998 | Nguyen | ............ | G06F 17/30595 |
| 6,260,059 B1 * | 7/2001 | Ueno | .................... | G06N 5/043 |
| | | | | 707/999.01 |
| 7,324,983 B1 * | 1/2008 | Morris | .................. | G06Q 10/06 |
| | | | | 706/45 |
| 7,337,438 B1 * | 2/2008 | Dobbins | ................ | G06F 8/425 |
| | | | | 717/141 |
| 7,647,631 B2 * | 1/2010 | Sima | .................... | G06F 21/577 |
| | | | | 709/201 |
| 7,849,397 B1 * | 12/2010 | Ahmed | ................ | G06F 17/243 |
| | | | | 715/221 |
| 8,065,410 B1 * | 11/2011 | Breen | .................. | H04L 67/025 |
| | | | | 702/182 |
| 8,606,773 B2 * | 12/2013 | Cypher | .................... | G06F 8/10 |
| | | | | 707/722 |

(Continued)

*Primary Examiner* — Reza Nabi
*Assistant Examiner* — Daniel Rodriguez
(74) *Attorney, Agent, or Firm* — Invoke

(57) ABSTRACT

Operations includes receiving a first data set, from a user, via a user interface; generating a first plurality of commands that are based on a plurality of actions performed by the user to submit the first data set via the user interface; executing the first plurality of commands to submit the first data set to a data repository; recording the plurality of actions performed by the user to obtain a recorded plurality of actions; receiving a second data set, from one or more devices, to be submitted to the data repository; responsive to determining that the second data set is associated with the first data set: generating a second plurality of commands that are based on the recorded plurality of actions and the second data set; executing the second plurality of commands to submit the second data set to the data repository.

19 Claims, 7 Drawing Sheets

(56) References Cited

U.S. PATENT DOCUMENTS

| | | | | |
|---|---|---|---|---|
| 8,621,382 B1* | 12/2013 | Young | G06F 3/0482 | 715/700 |
| 8,856,774 B1* | 10/2014 | Kulaga | G06F 8/65 | 717/168 |
| 8,938,688 B2* | 1/2015 | Bradford | G06F 3/0481 | 706/11 |
| 9,459,843 B1* | 10/2016 | Smith | G06F 8/315 | |
| 2002/0099319 A1* | 7/2002 | Saito | A61M 1/3693 | 604/6.04 |
| 2003/0037023 A1* | 2/2003 | Lyakovetsky | G06Q 10/10 | |
| 2003/0195771 A1* | 10/2003 | Fitzgerald | G06F 19/328 | 705/2 |
| 2004/0254935 A1* | 12/2004 | Chagoly | G06F 17/30899 | |
| 2005/0257148 A1* | 11/2005 | Goodman | G06F 17/243 | 715/226 |
| 2006/0005132 A1* | 1/2006 | Herdeg, III | G06F 9/45512 | 715/704 |
| 2009/0119587 A1* | 5/2009 | Allen | G06F 3/038 | 715/705 |
| 2009/0269800 A1* | 10/2009 | Covey | G01N 35/1095 | 435/29 |
| 2011/0041140 A1* | 2/2011 | Harm | G06F 9/4843 | 719/318 |
| 2012/0005689 A1* | 1/2012 | Schwartz | G06F 11/3668 | 719/318 |
| 2012/0047200 A1* | 2/2012 | Szabo | H04L 41/00 | 709/203 |
| 2012/0271960 A1* | 10/2012 | Geetha | G06F 9/4843 | 709/229 |
| 2012/0296879 A1* | 11/2012 | Yakout | G06F 17/30303 | 707/691 |
| 2013/0067326 A1* | 3/2013 | Mountain | H04N 21/4402 | 715/704 |
| 2013/0091536 A1* | 4/2013 | Manjunath | H04L 63/10 | 726/1 |
| 2014/0082513 A1* | 3/2014 | Mills | H04L 41/069 | 715/744 |
| 2014/0088994 A1* | 3/2014 | Kroh | G06F 19/345 | 705/2 |
| 2014/0173033 A1* | 6/2014 | McClintock | H04L 41/0246 | 709/217 |
| 2014/0237352 A1* | 8/2014 | Sriganesh | G06F 17/30876 | 715/234 |
| 2015/0066524 A1* | 3/2015 | Fairbrothers | G06F 19/345 | 705/2 |
| 2015/0073832 A1* | 3/2015 | Goodnow, II | G06F 19/322 | 705/3 |
| 2015/0186857 A1* | 7/2015 | Swinfen | G07F 19/211 | 705/17 |
| 2015/0324346 A1* | 11/2015 | Sankaran | G06F 17/246 | 715/212 |
| 2016/0063189 A1* | 3/2016 | Soon-Shiong | H04L 9/008 | 705/3 |
| 2016/0147975 A1* | 5/2016 | Han | G06F 19/3443 | 705/2 |
| 2016/0231870 A1* | 8/2016 | Summa | G06F 3/0481 | |
| 2016/0247163 A1* | 8/2016 | Donsky | G06Q 10/06 | |

* cited by examiner

```
<appStack>true</appStack>
<serviceRequestSteps>
<serviceRequestSteps type="formRequest" appOID="P01012_W01012B">
    <formActions>
        <formActions type="input">
            <input>AddressBookNumber</input>
            <mappedTo>1[19]</mappedTo>
            <action>SetQBEValue</action>
        </formActions>
        <formActions type="action">
            <controlID>15<controlID>
            <action>DoAction</action>
        </formActions>
        <formActions type="action">
            <controlID>1.0</controlID>
            <action>SelectRow</action>
        </formActions>
        <formActions type="action">
            <controlID>14</controlID>
            <action>DoAction</action>
        </formActions>
    </formActions>
</serviceRequestSteps>
```

Metadata 302

FIG. 3B

Portion 342
Portion 344
Portion 346
Portion 348
Portion 350
Portion 352
Portion 354

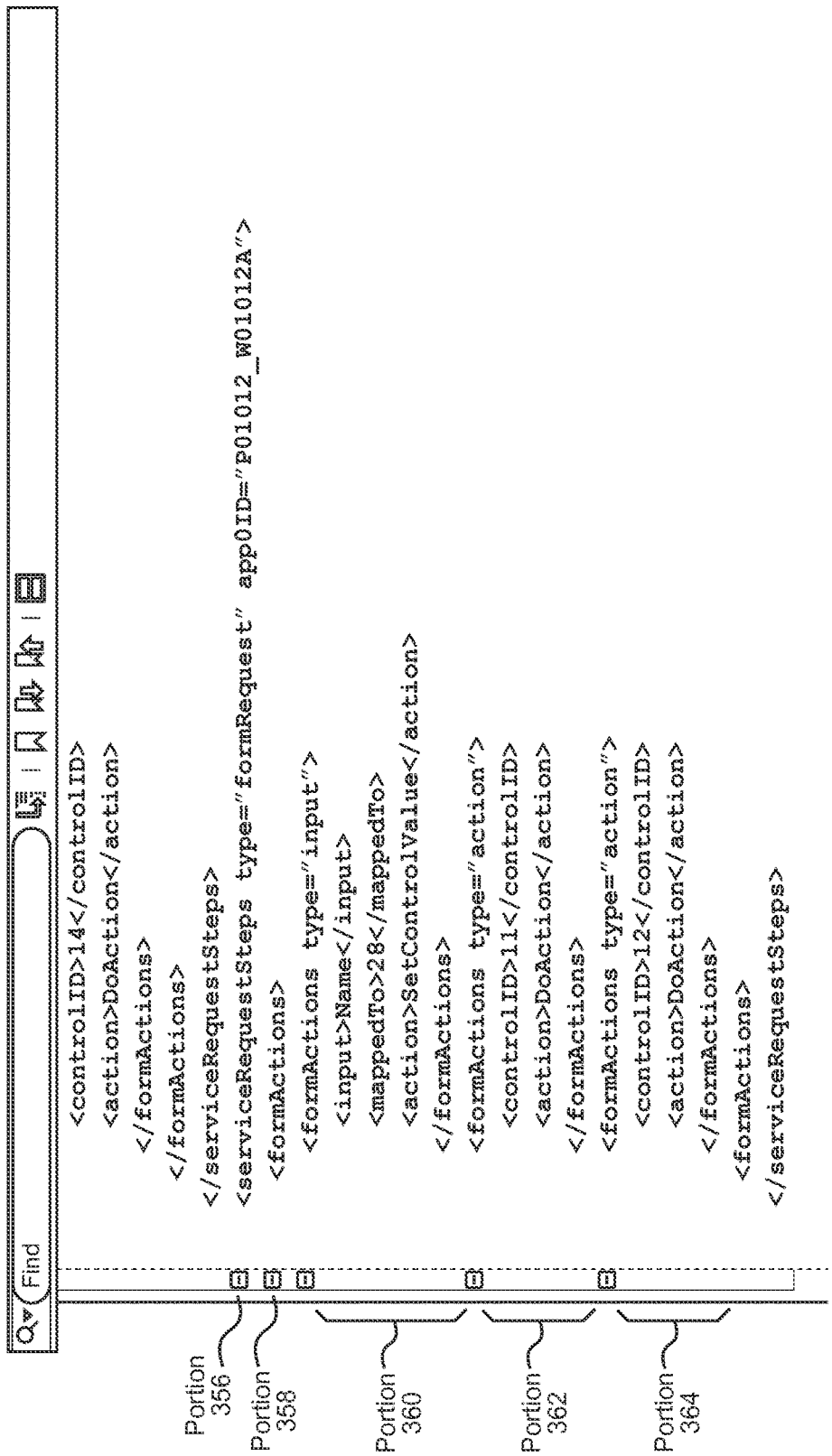

SIMULATING A USER INTERFACE TO SUBMIT DATA RECEIVED FROM A DEVICE

BENEFIT CLAIM; INCORPORATION BY REFERENCE

This application claims the benefit of U.S. Provisional Patent Application No. 62/197,479, filed Jul. 27, 2015, which is hereby incorporated by reference.

TECHNICAL FIELD

The present disclosure relates to user interfaces. In particular, the present disclosure relates to configuring a system to simulate a user interface to submit data received from a device.

BACKGROUND

A user interface includes a set of user interface elements through which a software application may communicate with an external environment, typically, a human user. A human user may interact with the user interface to enter or submit input data into the software application. A software application may use the user interface to display or return output data to a human user.

In some instances, a human user may perform repeated interactions with a user interface in order to update the data of a software application. In an example, a software application monitors the temperature of a particular machine. A human user may read the temperature from a sensor of the machine, and manually input the temperature through a user interface into the software application. The human user may repeatedly perform this action, such as, once per hour, or once per day, so that the data of the software application is current. In another example, a software application maintains an electronic address book of a company's customers. A human user may receive an address change notice in an email inbox. The human user may read an updated address from the address change notice, and manually enter the updated address in the address book. The human user may repeatedly perform this action, such as, every time an address change notice is received in the email inbox.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3B-D illustrate an example set of metadata that represents recorded actions to be used for submitting data sets.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. SIMULATING A USER INTERFACE TO SUBMIT DATA RECEIVED FROM A DEVICE
4. EXAMPLE EMBODIMENT
5. MISCELLANEOUS; EXTENSIONS
6. HARDWARE OVERVIEW

1. General Overview

In general, embodiments include using recorded user actions, corresponding to receipt of a first data set, for submitting a different second data set to a data repository. The first data set is received, via a user interface, from a user performing a set of actions to interact with the user interface elements of the user interface. The user's actions with the user interface elements are recorded to generate the recorded actions. When a second data set is received (from one or more devices; not via the user interface), an association between the second data set and the first data set is identified. Based on the association between the first data set and the second data set, the recorded actions are selected/used for submission of the second data set. Data objects within the data repository that are to be updated with the second data set are identified based on a mapping of the data objects to the user interface elements indicated in the recorded actions. Commands are generated and executed to update the identified content items, files, or data objects, within the data repository, with the second data set.

One or more embodiments described in this Specification and/or recited in the claims may not be included in this General Overview section.

2. Architectural Overview

Figure 1:
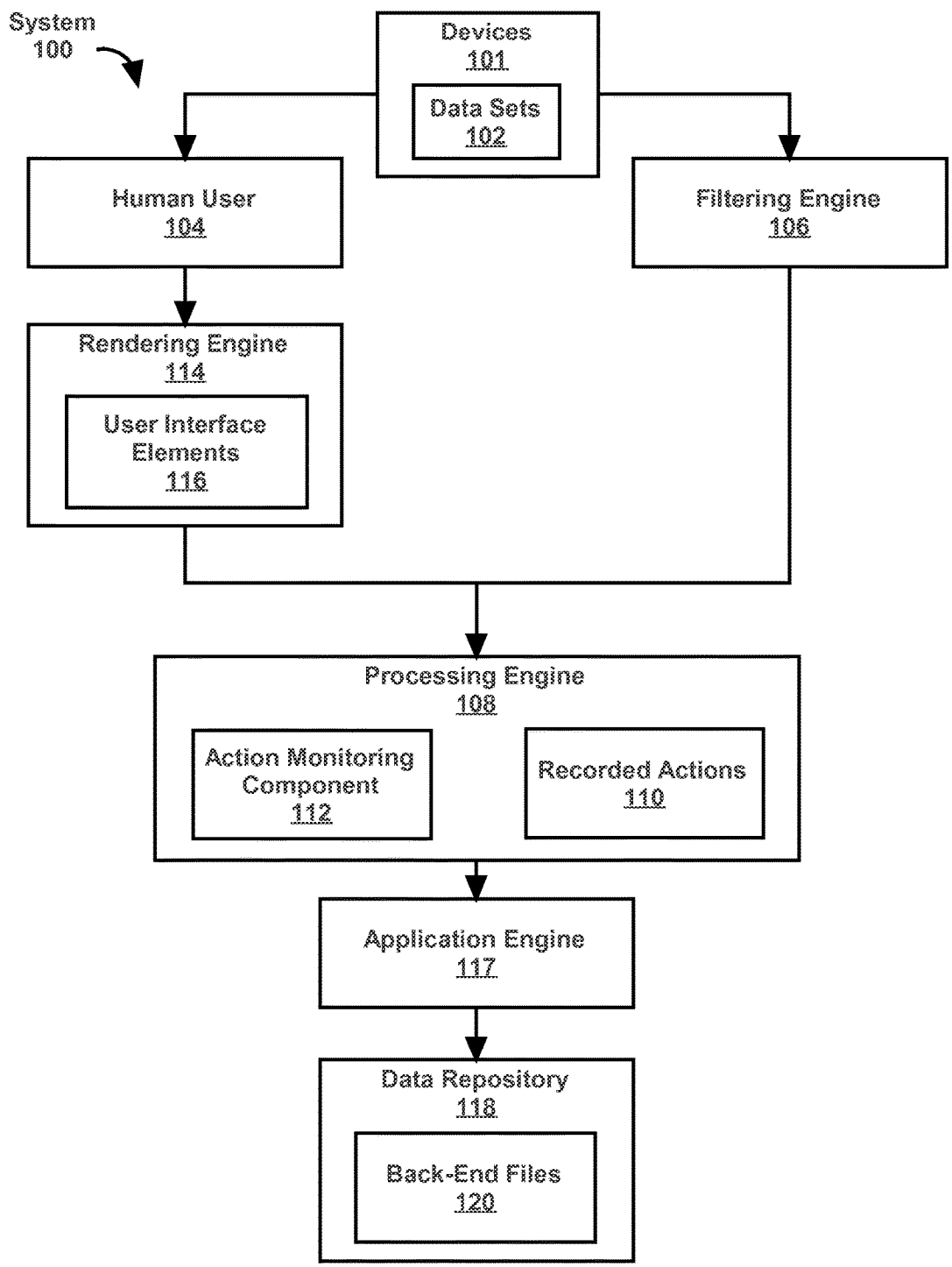
FIG. 1 illustrates a system in accordance with one or more embodiments.

FIG. 1 illustrates a system 100 in accordance with one or more embodiments. As illustrated in FIG. 1, system 100 includes one or more devices 101, one or more data sets 102, a human user 104, a rendering engine 114, one or more user interface elements 116, a filtering engine 106, a processing engine 108, an action monitoring component 112, one or more recorded actions 110, an application engine 117, a data repository 118, and one or more back-end files 120.

In one or more embodiments, system 100 may include more or fewer components, than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, devices 101 refer to any hardware devices that include a processor. A device may refer to a physical device executing an application or a virtual machine. Devices 101 receive and/or detect data that is used to compile and/or generate data sets 102. Examples of digital devices include a computer, a tablet, a laptop, a desktop, a netbook, a server, a web server, a network policy server, a mainframe, a television, a content receiver, a set-top box, a printer, a mobile handset, a smartphone, a personal digital assistant ("PDA"), a machine, a sensor, a gateway, and a device configured for use in an Internet of Things environment ("IoT device").

In an embodiment, a sensor includes a transducer that is configured to sense or detect one or more characteristics of the sensor's environment. Based on a characteristic detected, the sensor provides a corresponding output, such as an electrical or optical signal. Types of sensors include but are not limited to a temperature sensor, a pressure sensor, an ultrasonic sensor, a humidity sensor, a gas sensor, a radio-frequency identification (RFID) sensor, a motion sensor, an acceleration sensor, a displacement sensor, a location sensor, a tactile sensor, a proximity sensor, an audio sensor, a light sensor, a chemical sensor, a physiological sensor, a bio sensor, an accelerometer, a heart rate sensor, a pedometer, a camera, a video camcorder, a microphone, a hygrometer, a thermometer, and a Global Positioning System (GPS) detector.

In an embodiment, a gateway refers to a device that collects, filters, compiles, convert, translates, formats, or otherwise manages data received from one or more data sources. In an example, multiple sensors may transmit temperature readings to a gateway, each sensor using a different data format. The gateway may compile and translate the individual temperature readings into a single data set in a JSON format. In an example, a gateway may be implemented as one or more servers in a cloud computing environment. The servers may be used by one or more tenants.

In an embodiment, after initial configuration, an IoT device detects and/or receives data, and transmits the data over a network, without human interaction. Attributes of an IoT device that are set during initial configuration include what data to detect, the frequency at which the data is detected, and the destination to which the data is to be transmitted. An IoT device transmits data over HyperText Transfer Protocol (HTTP), File Transfer Protocol (FTP), Bluetooth, or any other communications protocol. In an example, an IoT device may be connected to the Internet. An IoT device may include a sensor and/or a gateway.

In one or more embodiments, data sets 102 are collections of data. Based on data detected and/or received by devices 101, data sets 102 are compiled and/or generated by human user 104 or by devices 101. Data sets 102 that are compiled and/or generated by human user 104 are submitted via user interface elements 116. Data sets 102 that are compiled and/or generated by devices 101 are submitted without any human user 104 and/or application interacting with user interface elements 116.

In an embodiment, data sets 102 include various attributes. Example attributes of a data set generated by a data source include an identifier (ID) of the data source, a type of a data source, a time at which the data was generated, and a label or description corresponding to each piece of data detected and/or received by the data source.

In an example, a temperature sensor, with Serial Number #12345, may detect a temperature of 100 degrees Celsius, at 12 noon. A user may read from a display of the temperature sensor, "100 degrees Celsius." The user may also read from a serial number label on the temperature sensor, "Serial Number #12345." The user may also read from a clock, "12 noon." The user may input "100 degrees Celsius," "Serial Number #12345," and "12 noon," into respective user interface elements 116. In this example, a data set including attributes corresponding to temperature, identifier, and time, has been generated by a user.

In an example, a temperature sensor, with Serial Number #12345, may detect a temperature of 100 degrees Celsius, at 12 noon. The temperature sensor may generate a data set as follows: "Serial Number: #12345, Device Type: temperature sensor, Temperature: 100 degrees Celsius, Time: 12 noon." The data set may be in a particular format, such as JSON or XML. In this example, a data set including attributes corresponding to identifier, device type, temperature, and time, has been generated by the temperature sensor. The identifier attribute is labeled as "Serial Number." The device type attribute is labeled as "Device Type." The temperature attribute is labeled "Temperature." The time attribute is labeled as "Time."

In an embodiment, data sets 102 generated by devices 101 are formatted and communicated in compliance with one or more standards. In an example, data sets 102 may be formatted based on a markup language, such as XML or JSON. In another example, data sets 102 may be transferred using web services and/or applications that adhere to a Representational State Transfer (REST) architectural style. In another example, data sets 102 may be transferred over a particular communications protocol, such as HTTP, FTP, or Bluetooth.

In one or more embodiments, rendering engine 114 refers to hardware and/or software configured to render user interface elements 116 and to receive input from user interface elements 116. Examples of user interfaces include a graphical user interface (GUI), a command line interface (CLI), a haptic interface, and a voice command interface. Different components of rendering engine 114 are specified in different languages. The behavior of user interface elements 116 is specified in a dynamic programming language, such as JavaScript. The content of user interface elements 116 is specified in a markup language, such as hypertext markup language (HTML) or XML User Interface Language (XUL). The layout of user interface elements 116 is specified in a style sheet language, such as Cascading Style Sheets (CSS). Alternatively, rendering engine 114 is specified in one or more other languages, such as Java, C, or C++.

In one or more embodiments, user interface elements 116 are specific elements of rendering engine 114 through which data sets 102 may be submitted to data repository 118. Examples of user interface elements 116 include checkboxes, radio buttons, dropdown lists, list boxes, buttons, toggles, text fields, date and time selectors, command lines, sliders, pages, and forms. User interface elements 116 may be presented concurrently or consecutively. In an example, a first form may display a first text field and a first button. When a user clicks on the first button, the first form may be closed, and a second form may be displayed. The second form may display a second text field and a second button. In this example, the first form, the first text field, and the first button are displayed concurrently. The first form and the second form are displayed consecutively.

In an embodiment, user interface elements 116 are associated with one or more attributes. Example attributes of a user interface element include an identifier (ID) of the user interface element, a descriptive name, a position of the user interface element on a page, and an image, animation, and/or text to be displayed with the user interface element. In an example, an ID of a user interface element may be a single number or a combination of numbers. A simple user interface element, such as a button, may be identified using a single number. For example, an identifier of a button may be "ID 101." A complex user interface element, such as a cell of a table, may be identified using a combination of numbers. A first number may identify the table. A second number may specify a row of the table. A third number may specify a column of the table. For example, an identifier of a cell of a table may be "ID 1(8,19)," indicating the first row and the nineteenth column of the table with "ID 1". Attributes of a user interface element are defined with the user interface element in a markup language for rendering engine 114. Additionally or alternatively, attributes are defined in a style sheet language, a dynamic programming language, and/or another language underlying rendering engine 114.

In an embodiment, user interface elements 116 are presented in a particular context by rendering engine 114. A context of a particular user interface element includes text, images, and/or other user interface elements surrounding the particular user interface element. In an example, a text field may be displayed on a form. Next to the text field may be the text, "Temperature." This text provides context for the text field, indicating that the text field is configured to receive temperature data.

In an embodiment, different sets of user interface elements 116 are presented for accessing a same data repository 118. In an example, for accessing a same data repository, a first set of user interface elements may be displayed on a desktop computer, while a second set of user interface elements may be displayed on a mobile device, such as a smartphone.

In one or more embodiments, filtering engine 106 refers to software and/or hardware configured to receive data sets 102 and to filter and process data sets 102. In an example, filtering engine 106 may include a whitelist of authorized data sources and filter out any data sets 102 that are not received from an authorized data source. In an example, filtering engine 106 may include a set of rules or criteria for filtering data sets 102 based on data included in data sets 102.

In an example, filtering engine 106 may include a cross-reference table that is used when multiple identifiers exist for a single device. For example, a particular device may use a first identifier to refer to itself, and may generate a data set including the first identifier. An application that references data repository 118 may use a second identifier to refer to the particular device. The application may expect to retrieve a data set from data repository 118 that includes the second identifier. A cross-reference table is used to map and/or translate the first identifier into the second identifier.

In one or more embodiments, processing engine 108 refers to hardware and/or software configured to receive data sets 102, from human user 104 or directly from devices 101 without human user 104. Processing engine 108 generates a set of commands for submitting data sets 102 to data repository 118.

In an embodiment, action monitoring component 112 refers to software and/or hardware configured to monitor and/or record actions performed by human user 104. Receiving a data set, via a user interface, requires that a user perform actions to interact with user interface elements of the user interface. The action monitoring component 112 includes functionality to identify and record the actions performed by the user to generate recorded actions 110.

In some embodiments, action monitoring component 112 which is illustrated as part of processing engine 108, may instead or in addition be a part of any other component within the system. Action monitoring component 112 may be a module or component of rendering engine 114. For example, action monitoring component 112 and the user interface may correspond to different components of a same application managed by the rendering engine 114. Action monitoring component 112 may be implemented as a plug-in application to rendering engine 114. Action monitoring component 112 may be implemented as a standalone program that monitors user input/output devices, such as a keyboard, a mouse, and a monitor or screen.

In one or more embodiments, recorded actions 110 include records of actions performed by human user 104 to interact with user interface elements 116 for submitting data sets 102. Recorded actions 110 are presented as metadata, which includes a description of the actions performed by human user 104 and the user interface elements 116 accessed by those actions. Recorded actions 110 are represented in a machine-readable and/or human-readable format, such as XML or JSON. In an embodiment, recorded actions 110 do not make direct references to data repository 118 and/or back-end files 120. Recorded actions 110 do not make direct modification of data repository 118 and/or back-end files 120 (without application engine 117).

In an embodiment, recorded actions 110 are described with reference to variables, constants, and/or default values related to data set 102. In an embodiment, a value of a variable is specified by data sets 102. The value of a variable may be different on each execution of recorded actions 110, depending on the data in data sets 102. Each variable may be associated with a variable name, type, or other attributes. For example, a variable may have a variable name, "Name," whose type is "String." Another variable may have a variable name, "Temperature," whose type is "Integer."

In an embodiment, a default value is a value that is to be submitted if no other value is specified by data sets 102. However, the default value may be overridden and changed by data sets 102 if a value is specified by data sets 102. In an example, temperature data may be gathered by multiple devices. Thermometers may be commonly used, while thermistors may be rarely used. A default value for a device type of a data source may be specified as "Thermometer" in recorded actions 110. If a data set does not specify a device type of the data source, then "Thermometer" is submitted. If the data set specifies that a device type of the data source is "Thermistor," then "Thermistor" is submitted.

In one or more embodiments, application engine 117 refers to hardware and/or software configured to execute the set of commands generated by processing engine 108 to submit data sets 102 to data repository 118. The set of commands are provided in a database language, such as Structured Query Language (SQL), or any other language, such as HTTP, C, or Java. Additionally or alternatively, the set of commands adhere to a REST architecture style.

In one or more embodiments, data repository 118 is any type of storage unit and/or device (e.g., a file system, database, collection of tables, server, or any other storage mechanism) for storing data. Further, data repository 118 may include multiple different storage units and/or devices. The multiple different storage units and/or devices may or may not be of the same type or located at the same physical site. Further, data repository 118 may be or may execute on the same computing system as one or more components of system 100 (such as, processing engine 108, and/or application engine 117). Alternatively or additionally, data repository 118 may be on a separate computing system than components of system 100. Data repository 118 may be connected to processing engine 108 and/or application engine 117 via a direct connection or via a network.

In an embodiment, data repository 118 stores data sets 102 in back-end files 120. Back-end files 120 are configured to maintain data sets 102 for subsequent retrieval and/or analyses. Back-end files 120 are stored and organized in a file storage system. Examples of file storage systems include database file systems, transactional file systems, network file systems, noSQL databases, and distributed file systems. In a file storage system, each of back-end files 120 has a filename. Each back-end file is organized in one or more directories and/or associated with one or more characteristics, such as a type of file, a topic, and an author. Updates to back-end files 120 are performed by application engine 117.

In an embodiment, data repository 118 is accessed by one or more software applications, such as an enterprise resource planning (ERP) application. An ERP application is configured to collect, store, manage, and interpret data in a variety of business activities. In an example, an ERP application is configured to monitor the temperature of a machine and to transmit an alarm when the temperature exceeds a threshold of 500 degrees Celsius. When data in data repository 118 indicates that the temperature of the machine has exceeded the threshold, an ERP application may trigger an alarm.

One or more other data repositories (not shown), apart from data repository 118, may be implemented across one or more components of system 100. These other data repositories may be accessed by components of system 100 while executing one or more operations. These other data repositories are not configured to maintain data to be assessed by another software application. In an example, processing engine 108 may be associated with a first data repository, and application engine 117 may be associated with a second data repository. Recorded actions 110 may be stored in the first data repository associated with processing engine 108.

3. Simulating a User Interface to Submit Data Received from a Device

Figure 2:
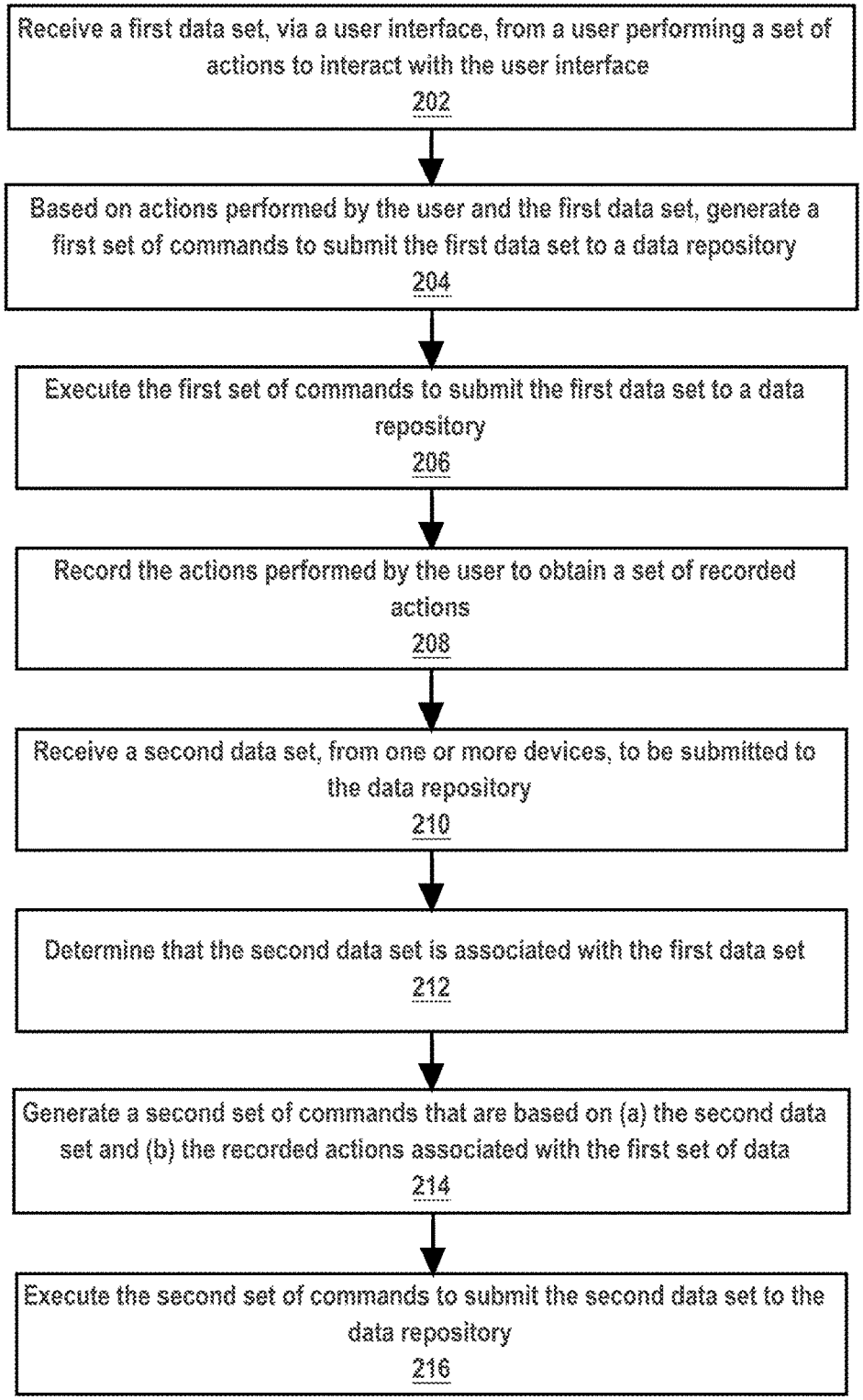
FIG. 2 illustrates an example set of operations for configuring a system to simulate a user interface in accordance with one or more embodiments.

FIG. 2 illustrates an example set of operations for configuring a system to simulate a user interface in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Initially, a first data set is received, from a user, via a user interface, in accordance with one or more embodiments (Operation 202). A user generates the first data set or reads the first data set as presented by one or more devices. The first data set is then received, via the user interface, as a result of the user performing actions to interact with the user interface. In an embodiment, actions performed by the user are identified in relation to user interface elements that are accessed by the actions. Additionally or alternatively, actions performed by a user are identified in relation to the page and/or form on which the actions are being performed.

In an example, a user interface may display a text field for entering a person's name. HTML specifying the text field may identify the text field using the identifier "001." A user may enter "Samuel Smith" in a text field. The user's action is identified as "entry of text into text field 001." The user interface may further display radio buttons for entering the person's gender as male or female. HTML specifying the radio buttons may identify the radio buttons using the identifier "002." A user may select the radio button corresponding to "male". The user's action is identified as "selecting radio buttons 002." The user interface may further display a "Submit" button. HTML specifying the submit button may identify the submit button as button "003." A user may select the submit button. The user's action is identified as "clicking button 003." Other examples of identified user actions include, but are not limited to opening a particular form xyz and selecting an item abc from a dropdown menu.

In an embodiment, the first data set, received from a user, includes actual data, to be submitted to a data repository. The data repository is updated using the first data set. In another embodiment, the first data set includes dummy data. The dummy data is not submitted to the data repository. The dummy data is received and the actions performed by the user are identified in order to generate recorded actions (described below with reference to Operation 208).

In one or more embodiments, based on the user actions to submit the first data set, a first set of commands are generated to submit the first data set to a data repository (Operation 204). In an example, a user may enter an identifier (ID) "007", of a user profile to be updated, into a profile identifier field labeled programmatically as field X. Field X of the user interface is mapped to profile identifier values of user profiles stored in a data repository. Furthermore, a user may enter the new mailing address, "123 Main Street" into field Y. Field Y of the user interface is mapped to address values of the user profiles stored in the data repository. Responsive to receiving "007" in field X and "123 Main Street" in field Y, a command is generated to update the mailing address of the user profile "007" stored in the data repository. The command itself may be in any suitable format for updating the data repository. Examples include but are not limited to SQL commands, HTTP commands, and Representational State Transfer (REST) commands.

In one or more embodiments, the first set of commands are executed to submit the first data set to a data repository (Operation 206). The first set of commands may be executed locally to update a local data repository or remotely to update a remotely located data repository. Executing the first set of commands may include executing a script or an application in communication with the data repository. In an embodiment, executing the first set of commands results in updating one or more back-end files of the data repository with the first data set.

In one or more embodiments, actions performed by the user, to interact with a user interface and submit the first set of data, are recorded to obtain a set of recorded actions (Operation 208). The user's actions may be identified for recording by the user interface itself. In an example, the user interface, when operating in a "capture" mode, records the user's actions. The user interface, when operating in a "normal" mode does not record the user's actions. In another example, a plug-in application to the user interface records actions performed by the user. In another example, a stand-alone program records actions performed by the user by monitoring communication between different components and/or applications that reference the user actions.

In an embodiment, the recorded actions include the interface elements of the user interface which were accessed by the user. The interface elements accessed by a user may be identified by detecting the input received in relation to the interface element. The interface elements accessed by a user may be identified by detecting the [x,y] coordinates of a mouse pointer and identifying the interface element displayed at the same [x,y] coordinates.

In an example, a user's actions include opening form ABC, entering a monitoring time "10 am" into field F05 of form ABC, and entering a humidity value "67%" into field F07 of form ABC. The recorded actions store the actions of the user with the user interface elements and the received values:

(1) Opening form ABC
(2) Receiving 10 am as input via field F05 of form ABC, and
(3) Receiving 67% as input via field F07 of form ABC.
[Actual format/language to express above recorded actions may be different]

Alternatively or in addition, the recorded actions store the actions of the user with the user interface elements and variables that represent the received values:

(1) Opening form ABC
(2) Receiving Time_Value as input via field F05 of form ABC, and
(3) Receiving Humidity_Value as input via field F07 of form ABC.
[Actual format/language to express above recorded actions may be different]

The variable names (e.g., Time_Value and Humidity_Value) may be generated by the system based on a context of the user interface elements that were used for submission of the data. For example, if field F05 (used by the user to submit the value "10 am") was preceded by the text "Time Value", then the system may concatenate the text with the underline character '_' to generate the variable name Time_Value. Time_Value is then used to represent "10 am" in the recorded action. Similarly, if field F07 (used by the user to submit the value "67%") was preceded by the text "Humidity Value", then the system may concatenate the text with the underline character '_' to generate the variable name Humidity_Value.

In an embodiment, the system may generate a variable name based on a label associated with interface element accessed by the user to submit a value. For example, a text field may be referenced within a set of code with the field variable name "Last_Name." Based on the field variable name "Last_Name", a variable name "Last_Name" may be generated to represent a last name value in the recorded action.

In addition to the context surrounding an interface element, the variable name may be generated based on user actions performed to cause a display of the interface element. For example, a system-generated variable name may include the name of the form that a user selected. The form name and/or the context of the user interface element within the form may be combined to generate a variable name.

In an embodiment, the system accepts user input to allow selection of variable names by a user. For example, subsequent to receiving selection of the value male via a radio button the system generates a recorded action: "Selection of male via radio button xyz." The system flags each value within the recorded action for replacement by a user-defined variable name. The system may present the value male and prompt the user for a variable name to represent the value male. The user may submit the variable name Gender to replace the value male in the recorded action. The user's selection of the variable name Gender creates an association between the variable name Gender and the radio button xyz (e.g., modifies the recorded action to include variable name Gender and radio button xyz).

In one or more embodiments, a second data set is received, from one or more devices, for submission to the data repository (Operation 210). The second data set is received, for example, from a sensor, IoT device, gateway, and/or application. The second data set is not received from the user via the user interface.

In one example, the second data set may be received from a temperature sensor, or from a gateway that has compiled temperature data from multiple temperature sensors. The second data set may be received over web services and/or applications adhering to a REST architectural style. For example, the second data set may be presented as JSON-formatted text over HTTP POST. In another example, the second data set may be presented as a spreadsheet.

In an embodiment, the second data set is a filtered and/or processed data set. In an example, the second data set is filtered based on an identifier of a data source included in the second data set. The identifier of the data source is compared to a whitelist of authorized data sources. The whitelist includes identifiers of devices that are authorized to transmit data to the system. If the data source is on the whitelist, then the second data set would be received. If the data source is not on the whitelist, the second data set may be discarded.

In an example, alert data corresponding to a temperature of a particular machine is received by the system. The data set is received by the system if the temperature of the particular machine is above 500 degrees Celsius. The data set is discarded by (a) the particular machine or (b) an intermediate device between the particular machine and the system if the temperature of the particular machine is below 500 degrees.

In one or more embodiments, the second data set (received from one or more devices) is determined to be associated with the first data set (received from a user via the user interface) (Operation 212). In an embodiment, an association between the first data set and the second data set is determined by a system based on attributes of the first data set matching the attributes of the second data set. Matching attributes may include matching variable names associated with the first data set and variable names (including labels, identifiers, etc.) associated with the second data set. If a match is found between variable names of the first data set and the second data set, then an association between the first data set and the second data set is identified.

In an embodiment, a system may identify an association between the first data set and the second data set based on user input identifying the association. For example, a first data set includes a temperature value 82 that is referenced in a recorded action with the variable name "temperature_value". A second data set includes a set of four values 75, 84, 71, and 95. A system may identify an association between the set of four values in the second data set and the temperature value 82 in the first data set based on user input. Specifically, the system may identify the association based on user input explicitly indicating that the set of four values, in the second data set, are associated with (a) the temperature value 82 from the first data set and/or (b) the variable name "temperature_value" that represents the temperature value 82 from the first data set.

In an embodiment, a system may determine whether the first data set (received from the user via the user interface) is associated with the second data set (received from a device without involvement of the user interface) without user input identifying the association. In an example, a first data set (received from a user) indicates a first set of values. The first set of values (a) correspond to a variable name temperature_value and (b) correspond to a sensor type thermometer that the user used to collect the temperature values. A second data set received directly from a device (not via the user interface) indicates a second set of values. The second set of values (a) correspond to the same variable name temperature_value and (b) correspond to a different sensor type thermistor used by the device to collect the temperature values. In this example, the system may determine that the first data set and the second data set are not associated (even though they correspond to the same variable name) because the sensor types for collecting the values are different. Alternatively, the system may have determined the first data set and the second data set are associated if both data sets were detected by the same type of sensor.

Responsive to the second data set being associated with the first data set: the recorded actions, corresponding to the submission of the first data set, are selected for generating commands to submit the second data set. Specifically, content items, files, or data objects, within the data repository that are to be updated with the second data set, are identified based on a mapping of the content items, files, or data objects to the user interface elements indicated in the recorded actions. A second set of commands are generated to update the identified content items, files, or data objects, within the data repository, with the second data set. Accordingly, the second set of commands are generated based on (a) the second data set and (b) the recorded actions corresponding to submission of the first data set (Operation 214).

In an example, the second data set includes a detected set of temperature values received from one or more devices (not from a user via a user interface). The detected set of temperature values are to be submitted to the data repository. The detected set of temperature values have an association (e.g., same variable name temperature_value) with a first temperature value previously submitted by a user via a user interface. Based on the association between the detected set of temperatures values and the previously submitted first temperature value, a recorded action RA1 corresponding to the user's submission of the first temperature value is selected. The recorded action RA1 is selected for generating a command(s) to submit the detected set of temperature values. The recorded action RA1 indicates "temperature_value received in field F02 inform xyz." Field F02 of form xyz is mapped to a file ItIsHot.txt in the data repository. Based on this mapping, a command(s) is generated to update the file ItIsHot.txt with the detected set of temperature values. Accordingly, the file ItIsHot.txt that is to be updated with the detected set of temperature values is identified based on the recorded action RA1 corresponding to receiving the first temperature value. More generally, the content within the data repository that is to be updated with the second data set is identified based on the recorded action corresponding to the first data set.

In one or more embodiments, the second set of commands are executed to submit the second data set to the data repository (Operation 216). The second set of commands may be executed locally to update a local data repository or remotely to update a remotely located data repository. Executing the second set of commands may include executing a script or an application in communication with the data repository. In an embodiment, executing the second set of commands results in updating one or more back-end files mapped to the user interface elements identified in the recorded actions. The back-end files are updated with the second data set.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
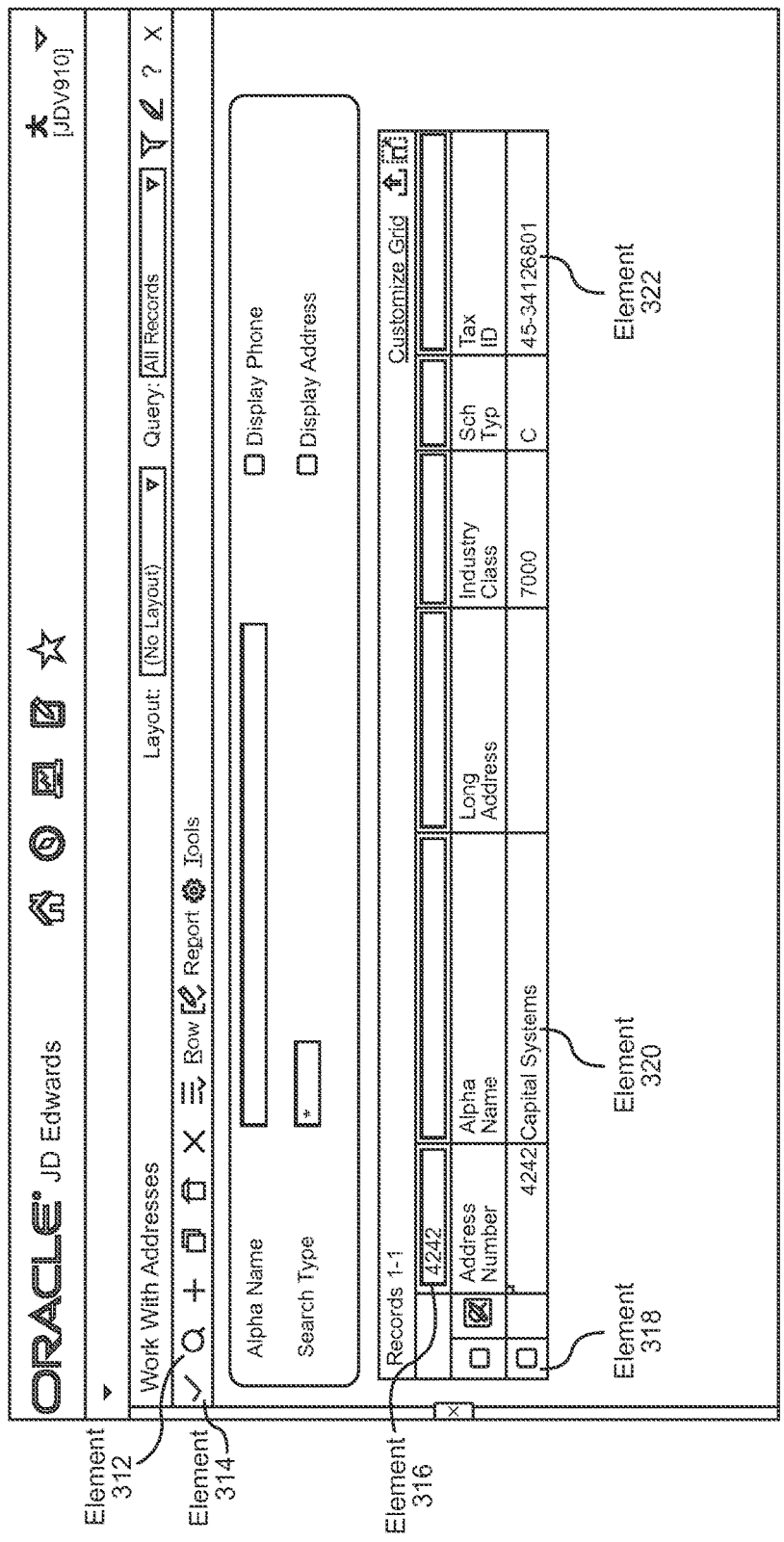
FIG. 3A illustrates an example set of actions interacting with a user interface in accordance with one or more embodiments.

FIG. 3A illustrates an example set of actions interacting with a user interface in accordance with one or more embodiments. A user performs actions interacting with the user interface to update a name of a customer. Specifically, the user first searches for a customer record with "Address Number" 4242. The user then changes the "Alpha Name" from "Capital Systems" to "Test Name." The user then searches for the customer record with "Address Number" 4242 again to verify that the update has been correctly made. The user interface includes various forms. Form 300 is configured to receive search criteria and to display customer records matching the search criteria. Another form (not shown) displays attributes of a customer record, such as "Alpha Name," and is configured to receive user input defining or updating the attributes. The following actions are performed by the user:

Action (1): On form 300, the user enters "4242" into a search query at element 316, which corresponds to an "Address Number" field. Element 316 is a portion of a grid, which includes various cells corresponding to attributes of a customer record.

Action (2): The user clicks a "Find" button at element 312. The customer record with "Address Number" 4242 is then displayed.

Action (3): The user selects the customer record with "Address Number" 4242 by selecting the row at element 318.

Action (4): The user clicks a "Confirm" button at element 314. At this point, another form is displayed. The other form displays the attributes of the customer record with "Address Number" 4242 and is configured to receive user input specifying or updating the attributes.

Action (5): On the newly opened form, the user enters "Test Name" into a text field for the "Alpha Name."

Action (6): The user clicks a "Save" button.

Action (7): The user clicks a "Close" button to close the form. At this point, form 300 in its last state, with "4242" entered in the text field at element 316, is displayed again.

Action (8): The user clicks the "Find" button at element 312.

Based on Actions (1)-(8), a set of commands are generated. The "Address Number" field is mapped to address numbers of the customer records stored in a data repository. The "Alpha Name" field is mapped to names of the customer records stored in the data repository. Responsive to receiving "2424" in the "Address Number" field and "Test Name" in the "Alpha Name" field, a command is generated to update the name of the customer record at "2424" stored in the data repository, using "Test Name."

Figure 3D:

FIGS. 3B-D illustrate an example set of metadata that represents recorded actions to be used for submitting data sets. Actions performed by the user above for updating a name of a customer are identified by the user interface. Actions are identified in relation to the user interface elements being accessed by the actions. Specifically, form 300 is identified as having ID P01012_W01012B. Element 316 is a portion of a grid and is identified as having ID 1[19], wherein "1" is the ID of the grid and "19" refers to the specific cell of the grid in which element 316 belongs. Element 312 is identified as having ID 15. Element 318 is identified as having ID 1.0. Element 314 is identified as having ID 14. Then, the other form (the form configured to display a customer record and to receive user input defining attributes of the customer record) is identified as having ID P01012_W01012A. The text field for "Alpha Name" is identified as having ID 28. The "Save" button is identified as having ID 11. The "Close" button is identified as having ID 12. The actions are recorded as metadata 302, represented in XML. As shown, metadata 302 includes various portions, including portions 342-372.

Portion 342 indicates a beginning of a set of recorded actions. Portion 344 indicates that a form with ID P01012_W01012B is being opened. Portion 346 indicates a beginning of a set of recorded actions for this particular form.

Portion 348 corresponds to Action (1) performed by the user. The value "4242" entered at Action (1) is recorded as a variable. The variable name is manually entered by the user and defined as "AddressBookNumber." As illustrated in metadata 302, the tag "input" precedes a variable name. The "AddressBookNumber" variable is recorded as being mapped to the user interface element with ID 1[19], which is element 316. The metadata tag "action" precedes a specified action. The action is recorded as "SetQBEValue," which indicates entering the value of the "AddressBookNumber" variable into the search query at element 316.

Portion 350 corresponds to Action (2) performed by the user. As illustrated, the user interface element with ID 15, which is element 312, is recorded as being accessed. The action recorded is "DoAction," which indicates clicking on the "Find" button at element 312.

Portion 352 corresponds to Action (3) performed by the user. As illustrated, the user interface element with ID 1.0, which is element 318, is recorded as being accessed. The action recorded is "SelectRow," which indicates selecting the row at element 318.

Portion 354 corresponds to Action (4) performed by the user. As illustrated, the user interface element with ID 14, which is element 314, is recorded as being accessed. The action recorded is "DoAction," which indicates clicking on the "Confirm" button at element 314.

Portion 356 indicates that a form with ID P01012_W01012A is being opened. Portion 358 indicates a beginning of a set of recorded actions for this particular form.

Portion 360 corresponds to Action (5) performed by the user. The value "Test Name" entered at Action (5) is recorded as a variable. The variable name is manually entered by the user and defined as "Name." As illustrated, the "Name" variable is recorded as being mapped to the user interface element with ID 28, which is the text field for "Alpha Name." The action is recorded as "SetControlValue," which indicates entering the value of the "Name" variable into the text field for "Alpha Name."

Portion 362 corresponds to Action (6) performed by the user. As illustrated, the user interface element with ID 11, which is the "Save" button, is recorded as being accessed. The action recorded is "DoAction," which indicates clicking on the "Save" button.

Portion 364 corresponds to Action (7) performed by the user. As illustrated, the user interface element with ID 12, which is the "Close" button, is recorded as being accessed. The action recorded is "DoAction," which indicates clicking on the "Close" button.

Portion 366 indicates that a form with ID P01012_W01012B is being opened. Portion 368 indicates a beginning of a set of recorded actions for this particular form.

Portion 370 corresponds to Action (8) performed by the user. As illustrated, the user interface element with ID 15, which is element 312, is recorded as being accessed. The action recorded is "DoAction," which indicates clicking on the "Find" button at element 312.

Portion 372 is added to the recorded actions in order to return values for verification and testing purposes. As illustrated, the tag "returnControlIDs" precedes the IDs of user interface elements to be returned. User interface elements with ID 1[20,51] are to be returned. ID 1[20,51] is an abbreviated way of referring to ID 1[20] and ID 1[51]. ID 1[20] corresponds to element 320 of form 300, which is the "Alpha Name" attribute of a customer record being displayed. ID 1[51] corresponds to element 322 of form 300, which is the "Tax ID" attribute of a customer record being displayed.

Once the recorded actions have been stored, a data set is received from a gateway. The data set is represented as JSON-formatted text, generated by the gateway. The data set includes information for updating a name of a customer, collected by the gateway. Specifically, the data set may specify that a customer record with an "AddressBookNumber" of "1234" is to be updated, and the "Name" of that customer record is to be changed to "ABC Company."

The variables included in the data set may be compared to the variables included in the recorded actions presented as metadata 302. As illustrated at portions 348 and 360 of metadata 302, the variables included in the recorded actions include "AddressBookNumber" and "Name." Since the variables included in the data set and the recorded actions match, an association is found between the data set received from the user via the user interface and the data set received from the gateway. The recorded actions presented as metadata 302 are selected.

User interface elements indicated in metadata 302 are mapped to content items, files, and/or data objects stored at the data repository. Based on metadata 302, the user interface element with ID 1[19], specified at portion 348, is mapped to address numbers of the customer records stored in the data repository. The user interface element with ID 28, specified at portion 360, is mapped to names of the customer records stored in the data repository.

The values of the variables in the recorded actions are determined based on the data set received from the gateway. The value of the "AddressBookNumber" variable is specified as "1234" by the data set. The value of the "Name" variable is specified as "ACB Company" by the data set. Responsive to receiving "1234" at user interface element with ID 1[19] and "ABC Company" at user interface element with ID 28, a command is generated to update the name of the customer record at "1234" stored in the data repository, using "ABC Company." The command is executed, and the customer record at "1234" is updated using "ABC Company."

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
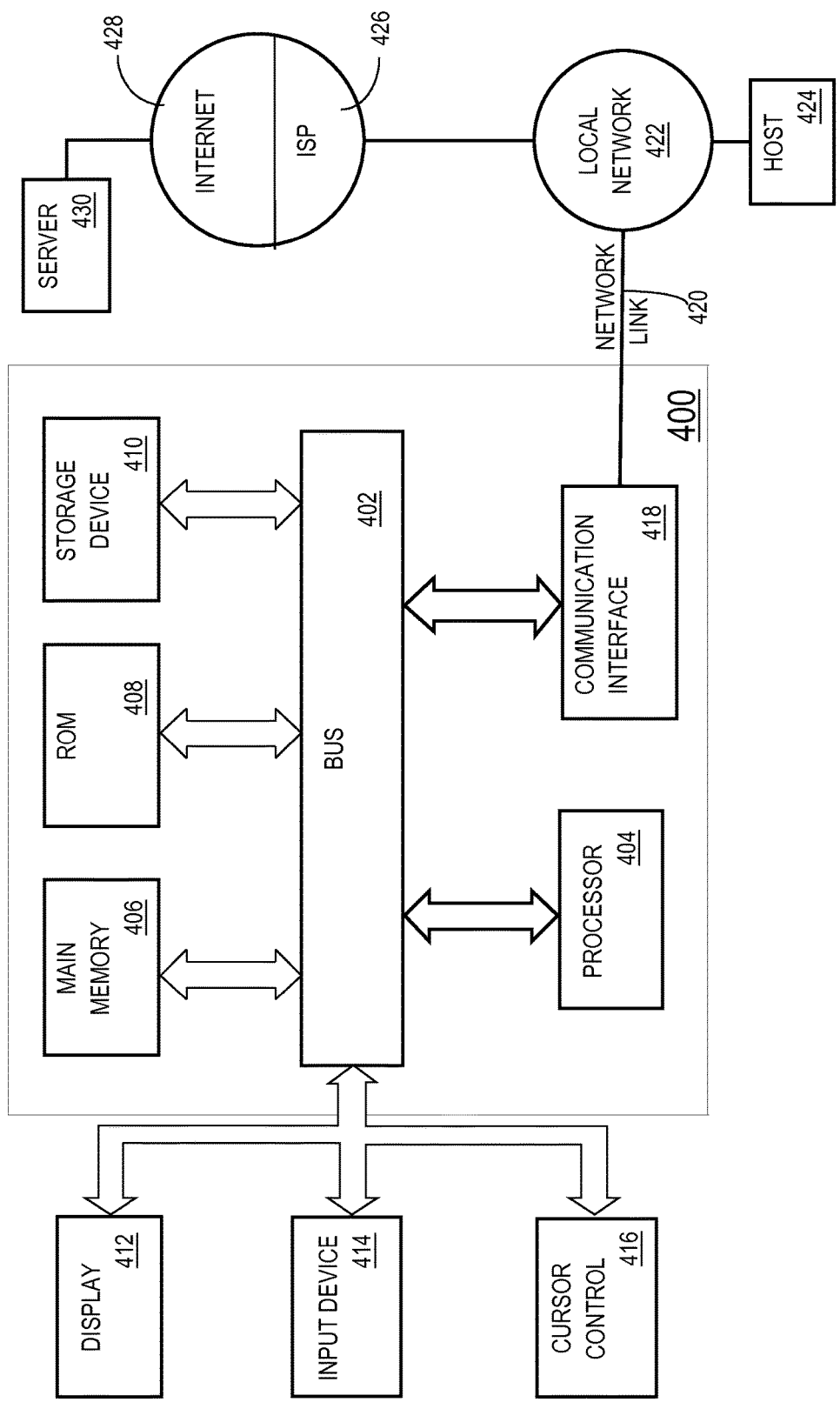
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   receiving a first data set, from a user, via a user interface;
   generating a first plurality of commands that are based on a first plurality of actions performed by the user to submit the first data set via the user interface;
   executing the first plurality of commands to submit the first data set to a data repository;
   recording the first plurality of actions, performed by the user, to obtain a first recorded plurality of actions;
   receiving a second data set, from the user, via the user interface;
   generating a second plurality of commands that are based on a second plurality of actions performed by the user to submit the second data set via the user interface;
   executing the second plurality of commands to submit the second data set to the data repository;
   recording the second plurality of actions, performed by the user, to obtain a second recorded plurality of actions;
   receiving a third data set, from one or more devices, to be submitted to the data repository, wherein the third data set is associated with a particular variable;
   identifying which of a plurality of data sets, comprising the first data set and the second data set, is associated with a variable that matches the particular variable;
   responsive to identifying the first data set, from the plurality of data sets, as being associated with a first variable that matches the particular variable: selecting the first recorded plurality of actions for processing the third data set;
   generating a third plurality of commands that are based on the first recorded plurality of actions and the third data set; and
   executing the third plurality of commands to submit the third data set to the data repository.

2. The medium of claim 1, wherein the third data set is received, from the one or more devices, without any user or application interacting with the user interface.

3. The medium of claim 1, wherein the one or more devices comprise at least one device connected to the Internet, and wherein the third data set is collected by the at least one device using a sensor.

4. The medium of claim 1, wherein the operations further comprise:
   receiving user input indicating the first variable is associated with the first data set.

5. The medium of claim 1, wherein generating the third plurality of commands based on the first recorded plurality of actions and the third data set comprises:
   identifying a set of one or more user interface elements identified in the first recorded plurality of actions;
   determining a content item, file, or data object mapped to the set of user interface elements identified in the first recorded plurality of actions;
   generating the third plurality of commands to update the content item, file, or data object mapped to the set of user interface elements, with the third data set.

6. The medium of claim 1, wherein the third data set is received, from the one or more devices, in a JavaScript Object Notation (JSON) format.

7. The medium of claim 1, wherein generating the third plurality of commands is further responsive to:
   determining that the one or more devices are included in a plurality of authorized devices.

8. The medium of claim 1, wherein the first plurality of actions comprises one or more of:
   selecting a checkbox, selecting a radio button, pressing a button, opening a form, and entering at least a portion of the first data set into a text field.

9. The medium of claim 1, wherein at least one action, in the first plurality of actions performed by the user, is identified in relation to a particular user interface element displayed by the user interface.

10. The medium of claim 1, wherein the operations further comprises:
    determining that user input is received in relation to a particular user interface element; and
    identifying an action, in the first plurality of actions, based on the user input received in relation to the particular user interface element.

11. The medium of claim 1, wherein recording the first plurality of actions comprises: detecting a particular action, by the user, in relation to a particular user interface element; determining an identifier of the particular user interface element; and
    recording the particular action and the identifier of the particular user interface element.

12. The medium of claim 1, wherein recording the first plurality of actions comprises: recording metadata, comprising the first plurality of actions, in a format that is human-readable and machine-readable.

13. The medium of claim 1, wherein the operations further comprise:
prior to generating the third plurality of commands, modifying the first recorded plurality of actions based on user input.

14. The medium of claim 1, wherein the first plurality of commands and the third plurality of commands are identical.

15. The medium of claim 1, wherein the operations further comprise:
using a same set of operations to update the data repository with (a) the first data set received from the user via the user interface and (b) the third data set received from the one or more devices.

16. The medium of claim 1, wherein the first recorded plurality of actions does not directly reference any back-end file stored in the data repository.

17. The medium of claim 1, wherein:
the first plurality of actions comprises one or more of: selecting a checkbox, selecting a radio button, pressing a button, opening a form, and entering at least a portion of the first data set into a text field;
the third data set is received, from the one or more devices, using HTTP and/or in a JSON format;
the third data set is received, from the one or more devices, without any user or application interacting with the user interface;
the one or more devices comprise at least one device connected to the Internet, and wherein the second data set is collected by the at least one device using a sensor;
the operations further comprise:
determining that a first user input is received in relation to a particular user interface element;
identifying a particular action, in the first plurality of actions, based on the first user input received in relation to the particular user interface element;
receiving a second user input comprising a first variable associated with the first data set;
modifying the first recorded plurality of actions, based on the second user input, prior to generating the third plurality of commands;
determining that the third data set is associated with a same first variable as the first data set;
recording the first plurality of actions comprises:
determining an identifier of the particular user interface element;
recording the particular action and the identifier of the particular user interface element in a format that is human-readable and machine-readable;
generating the third plurality of commands is further responsive to determining that the one or more devices are included in a plurality of authorized devices;
generating the third plurality of commands based on the first recorded plurality of actions and the third data set comprises:
identifying a set of one or more user interface elements identified in the first recorded plurality of actions;
determining a content item, file, or data object mapped to the user interface elements identified in the first recorded plurality of actions;
generating the third plurality of commands to update the content item, file, or data object mapped to the user interface elements, with the third data set.

18. A system, comprising:
at least one device including a hardware processor; and
the system configured to perform operations comprising:
receiving a first data set, from a user, via a user interface;
generating a first plurality of commands that are based on a first plurality of actions performed by the user to submit the first data set via the user interface;
executing the first plurality of commands to submit the first data set to a data repository;
recording the first plurality of actions, performed by the user, to obtain a first recorded plurality of actions;
receiving a second data set, from the user, via the user interface;
generating a second plurality of commands that are based on a second plurality of actions performed by the user to submit the second data set via the user interface;
executing the second plurality of commands to submit the second data set to the data repository;
recording the second plurality of actions, performed by the user, to obtain a second recorded plurality of actions;
receiving a third data set, from one or more devices, to be submitted to the data repository, wherein the third data set is associated with a particular variable;
identifying which of a plurality of data sets, comprising the first data set and the second data set, is associated with a variable that matches the particular variable;
responsive to identifying the first data set, from the plurality of data sets, as being associated with a first variable that matches the particular variable: selecting the first recorded plurality of actions for processing the third data set;
generating a third plurality of commands that are based on the first recorded plurality of actions and the third data set; and
executing the third plurality of commands to submit the third data set to the data repository.

19. A method comprising:
receiving a first data set, from a user, via a user interface;
generating a first plurality of commands that are based on a first plurality of actions performed by the user to submit the first data set via the user interface;
executing the first plurality of commands to submit the first data set to a data repository;
recording the first plurality of actions, performed by the user, to obtain a first recorded plurality of actions;
receiving a second data set, from the user, via the user interface;
generating a second plurality of commands that are based on a second plurality of actions performed by the user to submit the second data set via the user interface;
executing the second plurality of commands to submit the second data set to the data repository;
recording the second plurality of actions, performed by the user, to obtain a second recorded plurality of actions;
receiving a third data set, from one or more devices, to be submitted to the data repository, wherein the third data set is associated with a particular variable;
identifying which of a plurality of data sets, comprising the first data set and the second data set, is associated with a variable that matches the particular variable;
responsive to identifying the first data set, from the plurality of data sets, as being associated with a first variable that matches the particular variable: selecting the first recorded plurality of actions for processing the third data set;
generating a third plurality of commands that are based on the first recorded plurality of actions and the third data set;
executing the third plurality of commands to submit the third data set to the data repository; and
wherein the method is performed by at least one device including a hardware processor.

* * * * *